J. E. LEONARD.
FILM MAGAZINE.
APPLICATION FILED MAY 19, 1919.
1,336,640.
Patented Apr. 13, 1920.
4 SHEETS—SHEET 1.
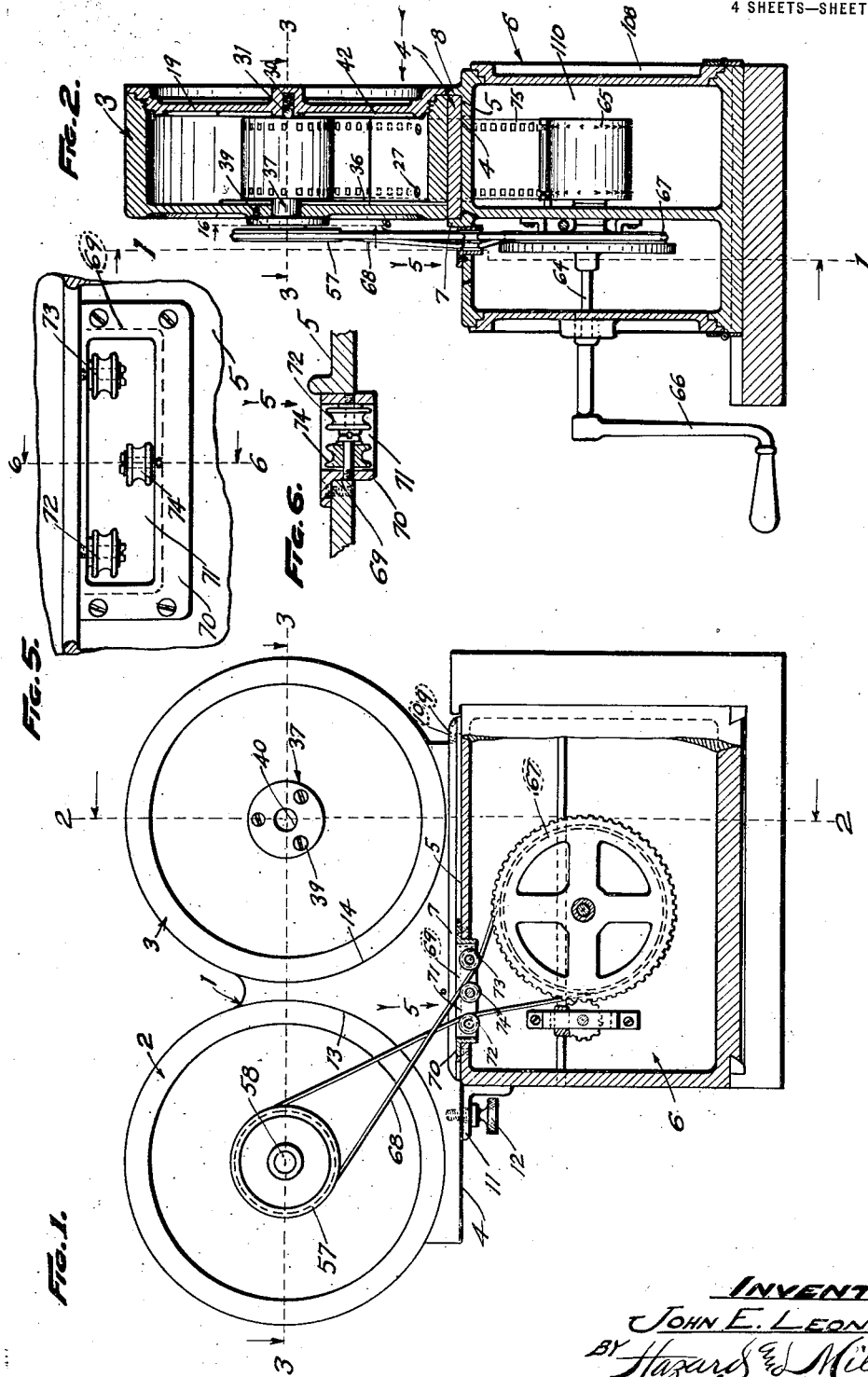

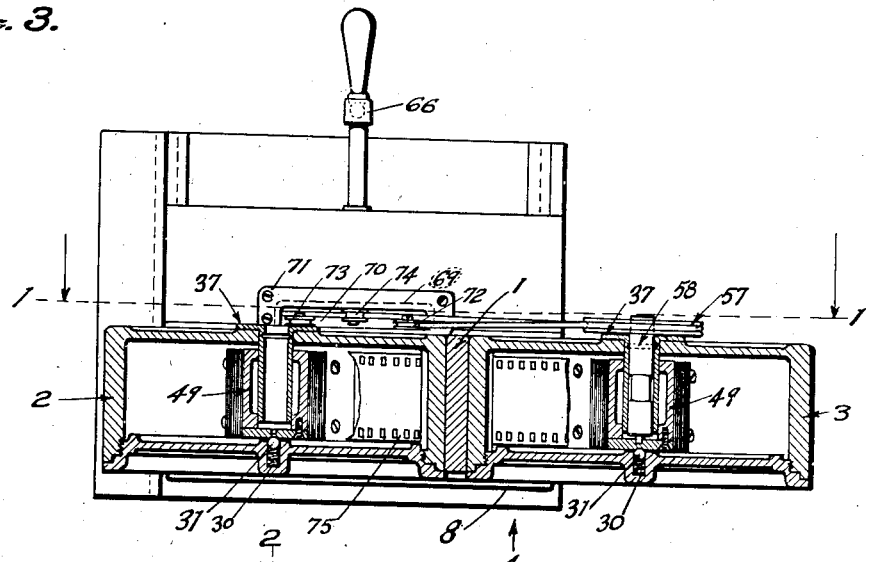
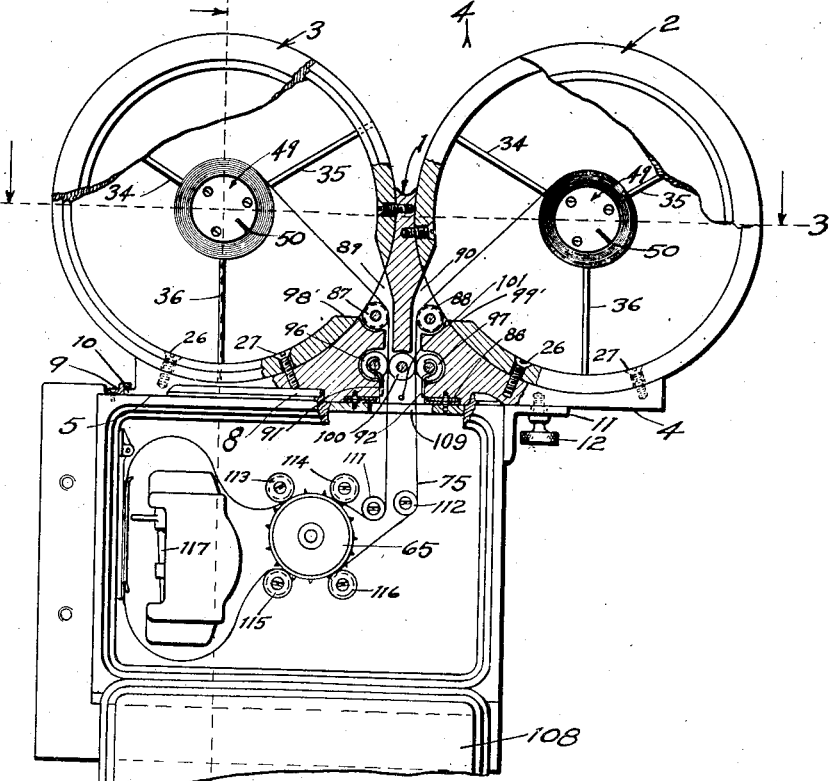

J. E. LEONARD.
FILM MAGAZINE.
APPLICATION FILED MAY 19, 1919.

1,336,640.

Patented Apr. 13, 1920.
4 SHEETS—SHEET 3.

INVENTOR.
JOHN E. LEONARD.
BY Hazard & Miller
ATTORNEYS

J. E. LEONARD.
FILM MAGAZINE.
APPLICATION FILED MAY 19, 1919.
1,336,640.
Patented Apr. 13, 1920.
4 SHEETS—SHEET 4.
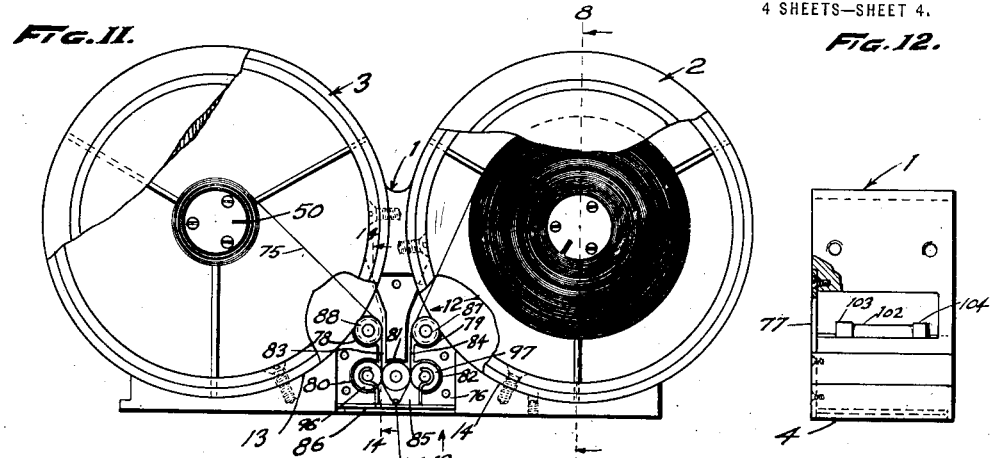
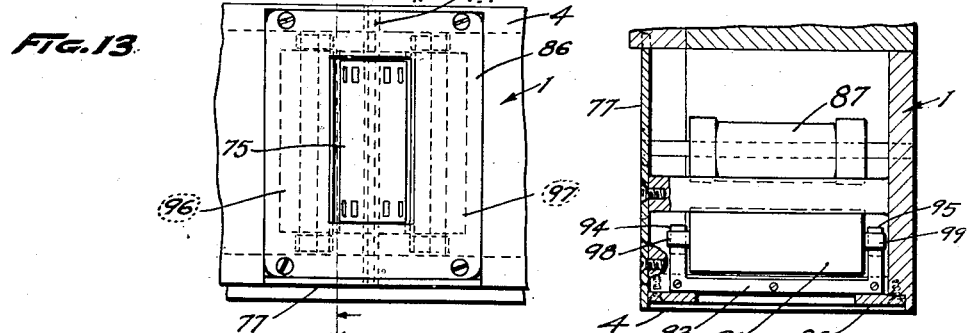
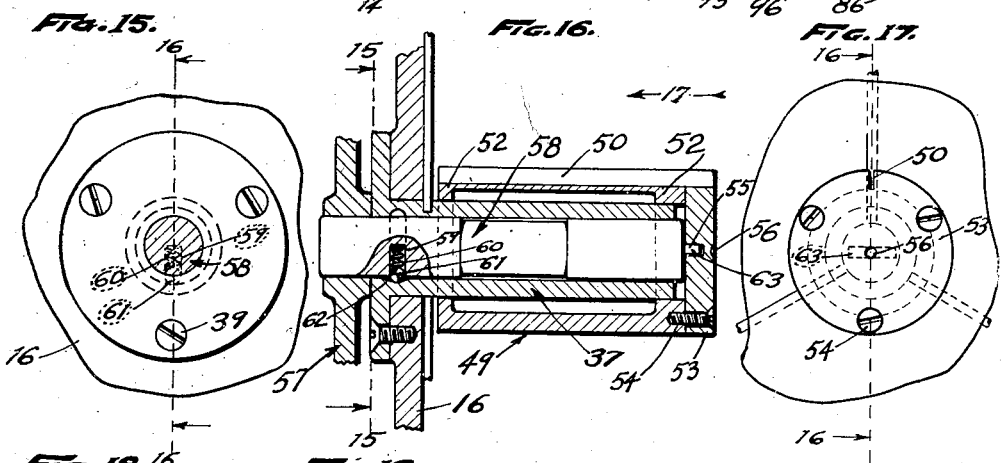
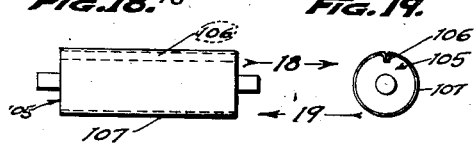
INVENTOR.
JOHN E. LEONARD.
BY Hazard & Miller
ATTORNEYS.

UNITED STATES PATENT OFFICE.

JOHN E. LEONARD, OF LOS ANGELES, CALIFORNIA, ASSIGNOR TO THE NATIONAL MOTION PICTURE CAMERA COMPANY, OF LOS ANGELES, CALIFORNIA, A CORPORATION OF CALIFORNIA.

FILM-MAGAZINE.

1,336,640.  Specification of Letters Patent.  Patented Apr. 13, 1920.

Application filed May 19, 1919. Serial No. 298,295.

*To all whom it may concern:*

Be it known that I, JOHN E. LEONARD, a citizen of the United States, residing at Los Angeles, in the county of Los Angeles and State of California, have invented new and useful Improvements in Film-Magazines, of which the following is a specification.

My invention relates to film magazines for motion picture cameras and the like and consists of the novel features herein shown, described and claimed.

Figure 1 is a vertical section on the lines 1—1 of Figs. 2 and 3 and looking in the direction indicated by the arrow and showing a film magazine embodying the principles of my invention mounted upon the operating box.

Fig. 2 is a vertical cross section on the lines 2—2 of Figs. 1 and 4.

Fig. 3 is a horizontal section on the lines 3—3 of Figs. 1, 2 and 4.

Fig. 4 is a sectional elevation looking in the opposite direction from Fig. 1 as indicated by the arrows 4 in Figs. 2 and 3.

Fig. 5 is an enlarged fragmentary top plan of the top of the operating box and showing the guide rollers for the operating belt, the view being taken looking in the direction indicated by the arrows 5 in Figs. 1, 2 and 6.

Fig. 6 is a fragmentary cross section on the line 6—6 of Fig. 5.

Fig. 11 is a side view of the film magazine removed from the box and taken upon the same plane and in the same direction as Fig. 4 and showing the film drawn up into the magazine and disconnected from the film operating mechanism.

Fig. 12 is a view in elevation of the film magazine base with the film winding casings removed and as seen looking in the direction indicated by the arrow 12 in Fig. 11.

Fig. 13 is a bottom plan view of the base as seen looking in the direction indicated by the arrow 13 in Fig. 11.

Fig. 14 is a vertical sectional detail on the lines 14—14 of Figs. 11 and 13.

Fig. 15 is a fragmentary cross section of one of the winding shafts, the view being taken on the lines 15—15 of Figs. 2 and 16.

Fig. 16 is a fragmentary longitudinal sectional detail on the lines 16—16 of Figs. 15 and 17.

Fig. 17 is a fragmentary side elevation looking in the direction indicated by the arrow 17 in Fig. 16.

Fig. 18 is a side elevation of one of the light excluding rollers, the view being taken looking in the direction indicated by the arrow 18 in Fig. 19.

Fig. 19 is an end view looking in the direction indicated by the arrow 19 in Fig. 18.

Figure 7:
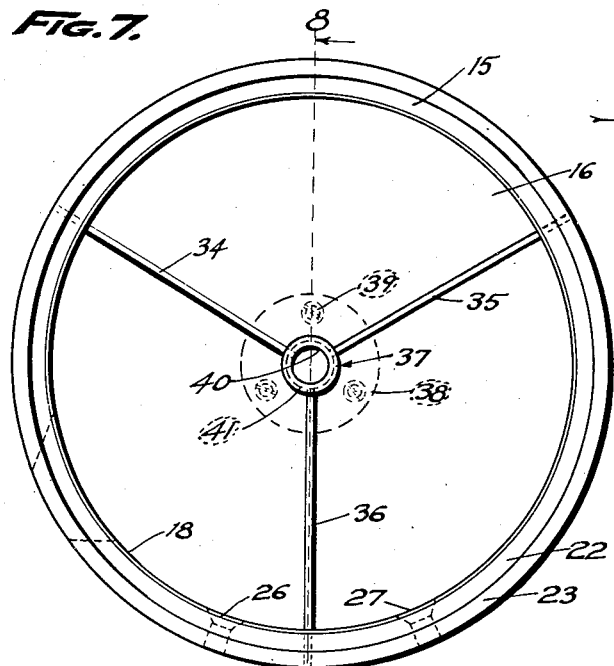
Fig. 7 is an enlarged side elevation of one of the film winding casings with the door removed and as seen looking in the direction indicated by the arrow 7 in Fig. 8.

Referring to the drawings in detail the film magazine comprises three main pieces, that is the base 1 and the film winding casings 2 and 3. The base 1 has a straight flat bottom 4 adapted to fit upon the top 5 of the film moving mechanism box 6 and parallel flanges 7 and 8 extend upwardly from the top 5 and the flat bottom 4 fits between the flanges 7 and 8.

A flange 9 extends upwardly across the front end of the box 6 and a lip 10 extends from the forward end of the base 1 to engage under the flange 9. A bracket 11 extends outwardly from the rear end of the box 6 and a hand wheel screw 12 is inserted upwardly through the bracket 11 and tapped into the base 1 to hold the magazine securely in place upon the box 6.

The film operating mechanism in the box 6 may be of any suitable construction but is preferably the construction shown, described and claimed in my companion application for film moving mechanism filed May 19, 1919, Serial No. 298,293. The film exposure parts of the film moving mechanism are of no consequence in this case and I have shown only the driving mechanism for operating the magazine and winding and unwinding the film.

Figure 8:
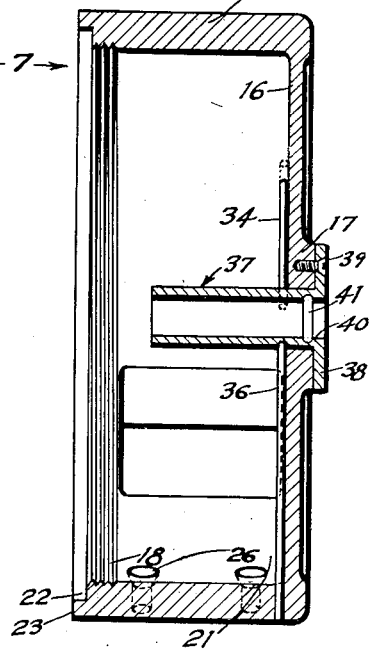
Fig. 8 is a diametrical vertical section on the lines 8—8 of Figs. 7 and 11.
Figure 9:
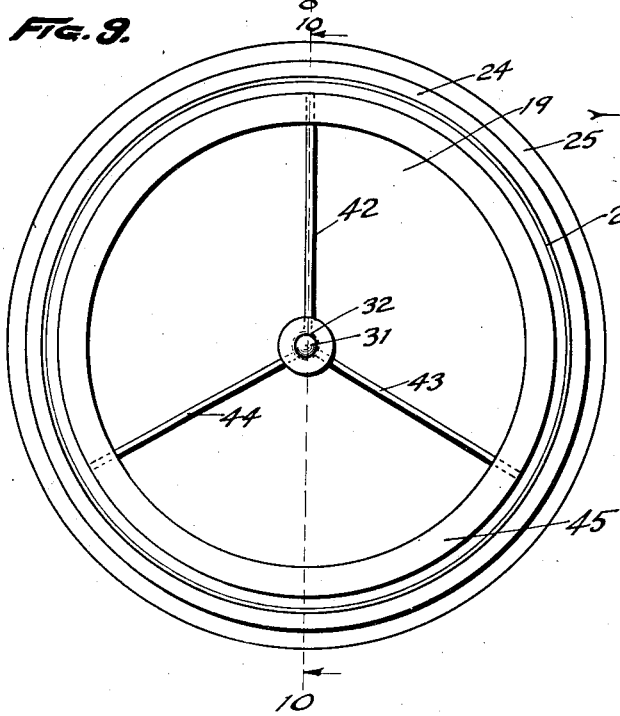
Fig. 9 is an inside elevation of the door removed from the casing in Figs. 7 and 8, and as seen looking in the direction indicated by the arrow 9 in Fig. 10.
Figure 10:
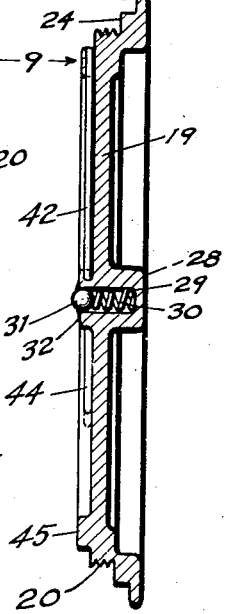
Fig. 10 is a diametrical cross section on the line 10—10 of Fig. 9.

The base 1 has a bearing face 13 against which the casing 2 fits and a second bearing face 14 against which the casing 3 fits, said bearing faces 13 and 14 being segments of a circle and extending through more than one-quarter of a circle. The casings 2 and 3 are substantially alike and the details of one casing are shown in Figs. 7, 8, 9 and 10.

A film winding casing comprises a casting forming an annular wall 15, a web 16 formed integral with one side of the annular wall, a hub 17 at the center of the web 16, screw threads 18 at the opposite side of the wall 17 from the web 16 and a cover 19 having external screw threads 20 fitting the screw threads 18 so as to close the chamber 21.

A seat 22 is formed in the annular wall 15 outside of the screw threads 18 and a finished face 23 is formed outside of the seat 22. The cover 19 has a finished face 24 to fit the seat 22 and a flange 25 to fit the finished face 23 so as to make a tight joint to exclude dust from the chamber 21.

Screw holes 26 and 27 are formed radially through the wall 15 and screws are inserted through the screw holes and tapped into the base 1 to hold the casing rigidly in place upon the base.

A hub 28 is formed at the center of the cover 19, a bore 29 is formed from the inner end of the hub, a spring 30 is inserted into the bore 29, a bearing ball 31 is placed in the bore against the spring and the metal 32 is upset around the ball to hold the ball in place so that substantially one-quarter of the ball projects beyond the inner face of the hub.

Bearing rods 34, 35 and 36 are inserted through the annular wall 15 close inside of the face of the web 16. A bearing sleeve 37 is inserted through an opening at the center of the hub 17 and the inner ends of the rods 34, 35 and 36 are tapped into the sleeve. The rods 34, 35 and 36 are arranged radially and equal distances apart.

A flange 38 extends from the outer end of the bearing sleeve 37 and screws 39 are inserted through the flange 38 and tapped into the hub 17 to hold the bearing sleeve rigidly in place. The opening 40 through the bearing sleeve is straight and round and a recess 41 is formed to extend outwardly from the opening 40.

Bearing rods 42, 43 and 44 are inserted through the flange 45 extending inwardly from the cover 19 and fixed into the inner end of the hub 28, said rods 42, 43 and 44 being arranged radially and fitting closely against the inner face of the cover 19.

Referring to Figs. 15, 16 and 17, the film spool 49 fits rotatably upon the sleeve 37 and has a notch 50 to receive the end of the film to start the winding process. The spool 49 consists of a sleeve chambered between its ends to form the bearing portions 52 fitting rotatably upon the periphery of the sleeve 37 and a head 53 fitting against the end of the sleeve and secured in place by cap screws 54.

The head 53 has a diametrically extending recess 55 in its inner face and a ball seat 56 in its outer face, said ball seat 56 fitting against the ball 31.

The belt wheel 57 is fixed upon a spindle 58, a bore 59 is formed in the side of the spindle, a spring 60 is placed in the bore, a ball 61 is placed in the bore 59 against the spring, the metal 62 being upset around the ball to hold the ball in the bore. The spindle 58 fits rotatably in the sleeve 37 and the ball 61 fits in the recess 41 to hold the spindle in place.

A tongue 63 extends from the end of the spindle 58 and fits in the recess 55, so that when the belt wheel 57 is operated the film spool 49 is operated to wind the film. When the film is winding or unwinding upon the spool 49 the edges of the film may bear more or less against the rods 34, 35 and 36 on one side and against the rods 42, 43 and 44 upon the other side to hold the film in line upon the spool.

There is a sleeve 37 for each of the casings 2 and 3 and a film spool 49 for each sleeve and for each casing. The belt wheel 57 carrying the spindle 58 may be moved from the casing 2 to the casing 3 or vice versa according to which way the film is to be wound.

Referring to Figs. 1 and 2, a crank shaft 64 is mounted in the box 6. A drive sprocket 65 is fixed upon the inner end of the crank shaft 64 and a hand crank 66 is fixed upon the outer end of the shaft. A belt pulley 67 is fixed upon the crank shaft 64 and a coiled wire belt 68 runs around the pulley 67 and around the pulley 57 so that as the hand crank 66 is operated to operate the film moving and exposure mechanism the film spool is operated to rewind the film.

The belt 68 passes through the top of the box 6 and is adapted to drive the belt wheel 57 when on either the casing 2 or the casing 3.

Referring to Figs. 1, 5 and 6, an opening 69 is formed through the top of the box 6 and a casing 70 is inserted through the opening, there being an opening 71 through the casing. Guide rollers 72 and 73 are mounted in the opening 71 in a line and a third guide roller 74 is mounted in the opening 71 in a separate line from the line of the rollers 72 and 73 so that the belt 68 may run upon the guide rollers 72 and 74 to drive the wheel 57 upon the casing 2 as shown in Fig. 1 and so that the belt may run upon the rollers 73 and 74 to drive the wheel 57 when operating upon the casing 3, the object being to hold the belt 68 from running upon itself where the belt crosses itself.

The driving sprocket 65 feeds the film 75 to and from the film moving and exposure mechanism and the film must pass from the casing 2 to the casing 3 and from the casing 3 to the casing 2 through the base 1.

Referring especially to Figs. 4, 11, 12, 13 and 14, the details of the base 1 are as follows:

The base 1 is a casting and the faces 13 and 14 are formed upon opposite sides of the longitudinal center. A recess 76 is formed in one side face of the casting to receive a cover plate 77. Before the plate 77 is applied, bores 78, 79, 80, 81 and 82 are formed in the casting from the face having the recess 76.

Slots 83 and 84 are milled straight up and down from between the bores 80 and 81 and between the bores 81 and 82 to communicate with the bores 78 and 79. The portion below the bore 81 is milled out to form a chamber 85, a recess is milled in the lower face 4 of the casting to receive a plate 86 around the chamber 85, a guide roller 87 is placed in the bore 79, a guide roller 88 is placed in the bore 78 and clearance spaces 89 and 90 are milled out above the bores 78 and 79.

Spring bearing frames 91 and 92 are fixed in the chamber 85, each of said bearing frames comprising a bar 93 and half bearings 94 and 95 extending upwardly from the ends of the bar 93. Rollers 96 and 97 are placed in the bores 80 and 82 with spindles 98 and 99 in the half bearings 94 and 95.

A roller 100 is placed in the bore 81 between the roller 96 and 97, and a pin 101 is placed centrally in the chamber 85 below the roller 100. The film 75 is placed upon a spool in one of the casings 2 or 3 and passed down around the pin 101 and upwardly and outwardly to the other spool in the other casing and the film is wound taut as shown in Fig. 11, then the plate 77 is applied and the magazine is ready for use. The rollers 87, 88, 96, 97 and 100 all have spindles 98 and 99 mounted in bearings to support the rollers so that the periphery of the rollers run free. Slots 98' and 99' are formed through the annular walls of the casings 2 and 3 to allow the film to pass to and from the guide rollers 87 and 88.

The guide rollers 87 and 88 have reduced portions 102 between their ends so that the film will bear upon the bearing portions 103 and 104, said bearing portions contacting with the perforated sides of the film so as to leave the sensitized portion of the film out of contact with the rollers.

The rollers 96, 97 and 100 are light excluding rollers and each roller is constructed as shown in Figs. 18 and 19. The body 105 has a longitudinally extending slit 106 and a piece of felt is placed with one end in the slit and wrapped around the body and the other end tucked in the slit to make a cover 107 for the roller. The rollers 96 and 97 are pressed toward the roller 100 by the spring bearing frames 91 and 92 so as to press the film against the roller 100. The rollers are longer than the slots 83 and 84 and longer than the width of the film so that when the film is drawn up against the pin 101 as in Fig. 11, light is excluded from the film casings 2 and 3. Of course the small portion of film exposed in the chamber 85 will be spoiled by the light.

In the practical operating of the magazine a new unexposed film is placed in one of the casings 2 or 3 upon the spool and threaded through the base and attached to the other spool as shown in Fig. 11 and if desired there may be a plurality of the magazines with one camera and when it is desired to use the film of a magazine, the magazine is mounted upon the camera box 6, the door 108 in the camera box opened and the operator will use a thumb and finger through the opening 109 of the camera box to grasp the portion of the film which is extending around the pin 101 and pull the loop of the film down into the camera box chamber 110 and then pass the loop around the guide rollers 111 and 112, under the guide rollers 113 and 114, over the guide rollers 115 and 116 in contact with the driving sprocket 65 and pass the loop around the film exposure mechanism 117 and close the door 108. As the camera is operated the film will be drawn from the full spool, passed through the camera and exposed and rewound upon the empty spool and when the film has been exposed and it is desired to remove the magazine, the film is removed from the parts 112 to 117 and wound up against the pin 101, and then the magazine is removed from the camera and another magazine may be substituted. The exposed film may remain in the casing in the magazine for any reasonable length of time without injury and may be developed at leisure. Of course the loop of the film which is exposed by opening the door 108 will be spoiled but this is a small matter.

The opening 109 through the top of the camera box 6 is larger than the chamber 85 so that the film may be readily grasped and pulled down from the position as shown in Fig. 11 to the position as shown in Fig. 4.

I claim:

1. A film magazine having, in combination, a base adapted to be applied to a camera box and having an up-standing central body with opposite quadrantal, concave seats, independent film casings removably mounted upon the seats in coplanar relation, film spools in the film casings, means whereby a film mounted upon one spool may be passed downwardly through the base and through a camera and back through the base to the spool, and means in the base for excluding light from the casing.

2. A film carrying magazine having film chambers in coplanar relation and with adjacent faces in close juxta-position and an intermediate throat between the lower portion of the chambers for the passage of the film into an exposure apparatus to which the base of the magazine is attachable and upwardly into which throat the bight of the film may be fully drawn until the magazine is attached to the exposure apparatus.

3. A film carrying magazine having film chambers in coplanar relation and with adjacent faces in close juxtaposition and an intermediate throat between the lower portion of the chambers for the passage of the film into an exposure apparatus to which the base of the magazine is attachable and upwardly into which throat the bight of the film may be fully drawn until the magazine is attached to the exposure apparatus, and a cover for the mouth of the throat.

4. In a film magazine, a film winding casing comprising an annular wall, a web formed integral with one side of the annular wall, a hub at the center of the web and screw threads at the opposite side of the wall from the web; a cover having external screw threads fitting the screw threads of the annular wall, and film bearing rods mounted radially against the inner face of the web, and other rods on the inner face of the cover.

5. In a film magazine, a film winding casing comprising an annular wall, a web integral with the annular wall, a hub at the center of the web, a bearing sleeve fixed through the hub, a belt wheel, a spindle fixed in the belt wheel and adapted to fit rotatably in the bearing sleeve, means for holding the spindle in the bearing sleeve, a film spool fitting upon the bearing sleeve, and means for removably connecting the spindle to the film spool.

6. In a film magazine, a base having an upwardly extending central portion, a bearing face upon one side of the central portion, a second bearing face upon the other side of the central portion, said bearing faces being segments of a circle, film winding casings fitting the bearing faces, film spools mounted in the casings, a belt wheel, a spindle fixed in the belt wheel and adapted to be removably inserted to either casing to rotate either spool.

7. In a film magazine, a film winding casing, a bearing sleeve fixed in the film winding casing, a film spool rotatably mounted upon the bearing sleeve in the casing, a belt wheel, a spindle fixed in the belt wheel and adapted to be inserted into the bearing sleeve to operate the spool, and yielding means for holding the spindle.

8. In a film magazine, a film winding casing having an annular wall, a web formed integral with one side of the annular wall and a cover screwed into the other side of the wall, a bearing sleeve fixed through the web, a spool mounted upon the bearing sleeve and having a head, a ball yieldingly mounted in the cover to engage the head, a belt wheel, a spindle fixed in the belt wheel and adapted to be inserted into the bearing sleeve and having means forming a connection for rotating the spool.

9. In a film magazine, a base, film winding casings mounted upon the base, there being passages through the base from the casing for the film, and rotatory film engaging means in the passages for excluding light from the casings.

10. In a film magazine, a base having film winding casings, there being passages from the casings downwardly through the base for the film, a roller between the passages and rollers spring pressed toward the first roller as to press the film against the first roller on both sides and close the film passages to light.

11. In a film magazine, a base, film winding casings mounted upon the base, there being passages through the base so that a film mounted in one casing may pass downwardly through the base and upwardly through the base to the other casings, a roller mounted in the base between the two passages and in position to be engaged by the film going up and down, rollers mounted in the base to engage the film and press the film against the first roller and a stop pin mounted below the first roller so that when a film has been passed from one spool through the base to the other spool and wound taut the film will press against the pin, and so that the film will be within reach to be pulled downwardly into the camera box.

12. In a film carrying magazine, a base having film chambers at each end and having an intermediate throat for the passage of the film into an exposure apparatus to which the base is attachable and upwardly into which throat the bight of the film may be fully drawn until the base is so attached, and a cover for the mouth of the throat.

13. In a film carrying magazine, a base having film chambers at each end and having an intermediate throat for the passage of the film into an exposure apparatus to which the base is attachable and upwardly into which throat the bight of the film may be fully drawn until the base is so attached, a cover for the mouth of the throat, and means in the throat constantly engaging the sides of the bight so as to exclude light rays from passing from the throat into the chambers.

14. In a film carrying magazine, a base having film chambers at each end and having an intermediate throat for the passage of the film into an exposure apparatus to which the base is attachable and upwardly into which throat the bight of the film may be fully drawn until the base is so attached, a cover for the mouth of the throat, and yielding means in the throat constantly engaging the sides of the bight so as to exclude light rays from passing from the throat into the chambers.

15. In a film carrying magazine, a base having film chambers at each end and having an intermediate throat for the passage of the film into an exposure apparatus to which the base is attachable and upwardly into which throat the bight of the film may be fully drawn until the base is so attached, a cover for the mouth of the throat, and bight forming means in the throat to facilitate the extension of the bight so that it can be threaded in the exposure apparatus.

16. In a film magazine, a film winding casing having an annular wall, a web formed integral with one side of the annular wall and a cover screwed into the other side of the wall, a bearing sleeve extending from the web, a spool mounted upon the bearing sleeve and having a head, and means yieldingly mounted in the cover to engage the head.

17. In a film magazine, a film winding casing, a cover attached to one side of the casing, a bearing sleeve extending from the opposite side of the casing, a spool mounted upon the bearing, and a belt wheel having a spindle extending axially therefrom and adapted to be inserted into the bearing and having means to interengage with the spool so as to rotate the latter.

In testimony whereof I have signed my name to this specification.

JOHN E. LEONARD.